United States Patent

[11] 3,581,184

| | | |
|---|---|---|
| [72] | Inventor | Edward T. E. Hurd, III<br>Burlington County, N.J. |
| [21] | Appl. No. | 825,873 |
| [22] | Filed | May 19, 1969 |
| [45] | Patented | May 25, 1971 |
| [73] | Assignee | Honeywell Inc.<br>Minneapolis, Minn. |

[54] ISOLATOR FOR DC SIGNAL TRANSMITTER
8 Claims, 3 Drawing Figs.

[52] U.S. Cl. ................................................. 321/2,
324/118, 330/10
[51] Int. Cl. ........................................... H02m 3/32,
H03f 3/38, G01r 19/18
[50] Field of Search .......................................... 321/2, 8;
330/10; 324/99, 118

[56] References Cited
UNITED STATES PATENTS
3,241,080  3/1966  Hinrichs ....................... 330/10
3,430,125  2/1969  Povenmire et al. ............ 321/2

Primary Examiner—William H. Beha, Jr.
Attorneys—Arthur H. Swanson and Lockwood D. Burton ABSTRACT: There is disclosed a signal isolator for DC signals which includes a closed-loop, magnetic induction null-balanced output circuit. The DC input signals are chopped and applied as input signals to a first or input winding on a transformer. A sensing winding of the transformer detects the net flux in the transformer core. The signal thereby produced is amplified and converted to a DC output signal. A portion of the output signal is chopped and applied as feedback signal to a third or feedback winding on the transformer. The feedback signal is synchronous with the signal applied to the input winding and is applied to the feedback winding in such a way that the flux produced thereby opposes the flux produced by the signal in the input winding. The sensing winding detects any net flux resultant from the opposed input and feedback signals.

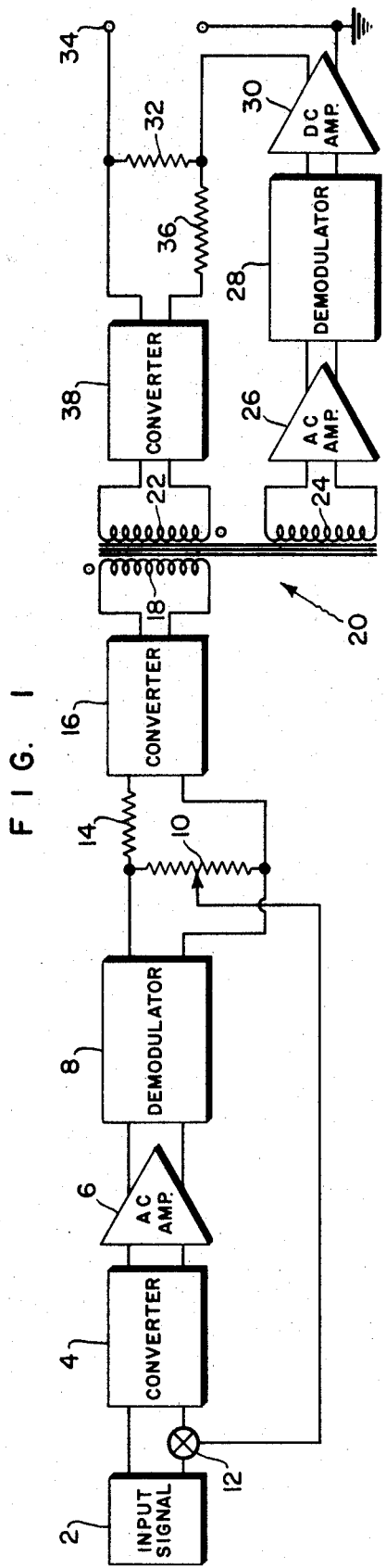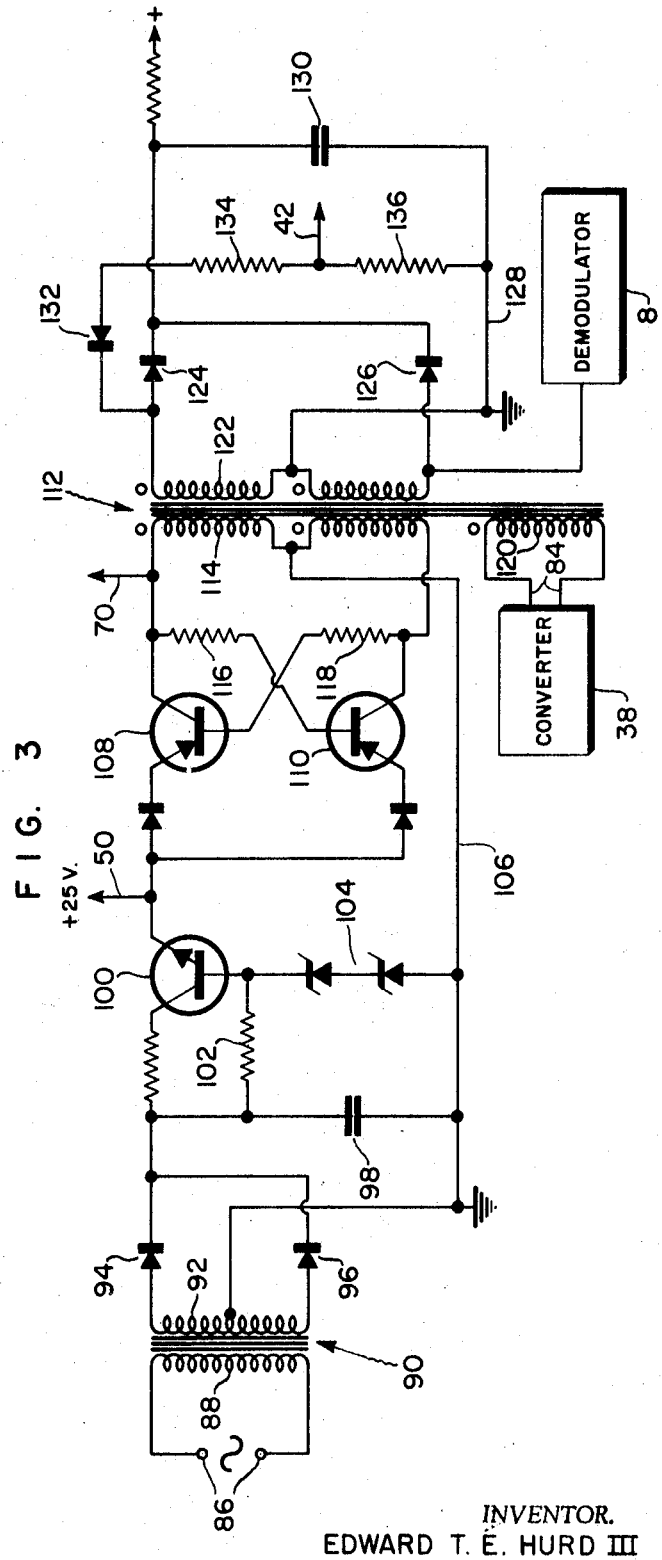
INVENTOR.
EDWARD T. E. HURD III
ATTORNEY.

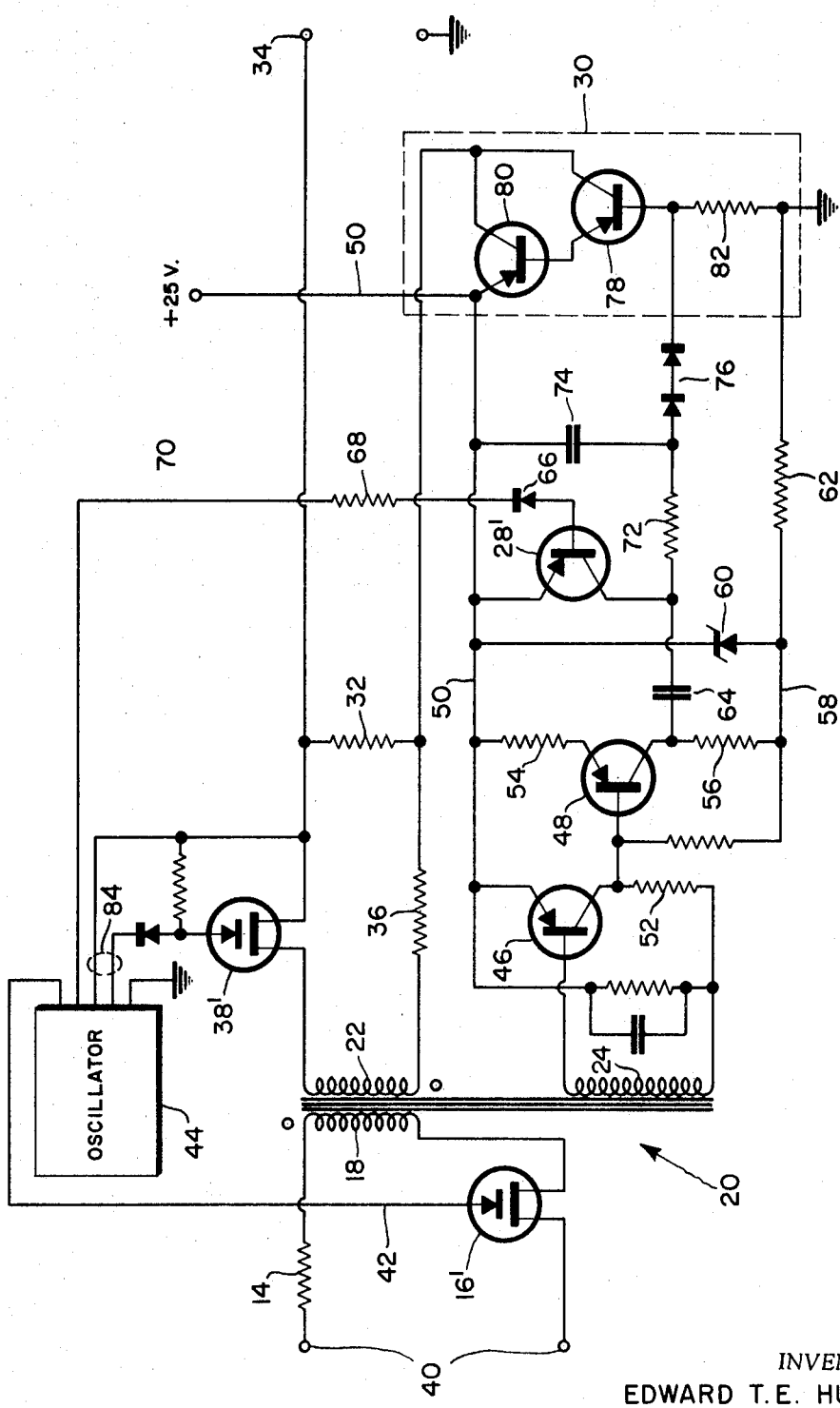

ISOLATOR FOR DC SIGNAL TRANSMITTER

The present invention relates to signal transmitters, and more particularly, to signal line isolators suitable for use with signal transmitters. In the art relating to industrial process control apparatus, various parameters of the process under control are measured and an electrical signal is generated which is representative of the measured parameter. Signals thus generated are transmitted to suitable control apparatus where they are manipulated to provide indications, records, control functions or the like, all related to the process under control. These latter instrumentalities are frequently located remotely from the process or the measuring instrument. Accordingly, the signals generated by the sensor must be translated into a form suitable for transmission to the remote locations. Many of the primary sensors presently available produce a signal which is a voltage type signal, frequently on the order of millivolts in magnitude. Since the primary sensor must, of necessity, be in the environment of the process under control, and such processes often include the use of large quantities of electrical energy, it is not unusual to find that a sizable electrical signal is superimposed upon the signal generated by the primary sensor. The superimposed signal usually appears as a "common mode" signal, that is, a signal which is applied equally and inphase to both terminals of a two output terminal primary sensor. For this reason, signal transmitters associated with such primary sensors are usually in the form of a differential amplifier which responds to the differential, or intelligence, signal generated within the primary sensor and is, in theory, nonresponsive to the common mode signal. Practice has demonstrated, however, that a simple differential amplifier is not adequate to the total rejection of the common mode signal. This is due, at least in part, to the fact that a ground connection at each of several locations somewhat physically removed from each other may be at significantly different potentials.

Some prior art transmitters have provided means wherein attempts have been made to electrically compensate for any imbalance that may have been developed as a result of the common mode signal. In general, however, it has been found desirable to conductively isolate the input circuit of such a transmitter from the output circuit. Such isolation may be accomplished by the use of a transformer coupling between the input and output circuits. In these latter type circuits the output of the transformer is rectified to produce a corresponding DC signal which is representative of the input differential DC signal produced by the primary sensor.

It is now well established that present day technology has advanced to the point where each of the instrumentalities in a process control loop may be capable of functioning with a degree of accuracy far beyond that of comparable instruments of relatively few years ago. As was just observed hereinabove, the output of the transformer-isolated circuits of the prior art were "open loop" arrangements in which the output signal is a function of the transfer characteristics of the transformer and the magnitude of the signal applied to the primary thereof. Such arrangements do not provide the high order of accuracy required by today's technology.

Accordingly, it is an object of the present invention to provide an improved, isolated, signal transmitter which is characterized in the ability to produce an output signal which is a highly accurate representation of the input signal.

It is another object of the present invention to provide an improved signal transmitter as set forth wherein the output of the isolating transformer comprises a closed loop null-balancing circuit.

It is a further object of the present invention to provide an improved signal line isolator which is characterized in that a highly accurate translation of a DC input signal is provided and which features considerable flexibility in its application.

In accomplishing these and other objects, there has been provided in accordance with the present invention a signal line isolator for DC input signals which includes means for converting input DC signal into a corresponding alternating signal. The alternating signal is applied to an inductive null-balance arrangement wherein the alternating signal is compared to a correspondingly alternating feedback signal to produce an inductive null. Any deviation from the null condition is inductively detected to produce a signal representative of that deviation. The deviation is then manipulated to produce a signal for modifying the magnitude of the alternating feedback signal to reestablish a null condition. A DC output signal is derived which is proportional to the feedback signal necessary to establish the null condition, which DC output signal is a highly accurate representation of the DC input signal applied to the input of the isolator, and which is conductively isolated from the input signal means.

A better understanding of the present invention may be had from the following detailed description when read in connection with the accompanying drawings in which:

FIG. 1 is a schematic block diagram of an isolated signal transmitter embodying the present invention;

FIG. 2 is a schematic circuit diagram of a signal isolator embodying the present invention; and FIG. 3 is a schematic diagram of an isolated power supply suitable for use with the circuits of FIGS. 1 and 2.

Referring now to the drawings in more detail, there is shown, in FIG. 1, a transmitter which includes a source of input signals 2. The source 2 may include any of a number of primary sensor elements with their associated measuring circuits which, together, produced a DC signal representative of some measured parameter. The signal thus produced is applied as input signal to a converter, or chopper, 4, where the direct current input signal is converted to a corresponding alternating signal. The resulting oscillatory signal is amplified by an AC amplifier 6. The output of the AC amplifier is then demodulated or reconverted to a proportional DC signal in a synchronous demodulator 8. The output of the demodulator 8, being a current signal, is applied across a feedback slidewire resistor 10 to produce a corresponding voltage signal. A portion of the thus developed voltage signal is picked off by a slider associated with the slidewire resistor 10 and connected in negative feedback relationship to a summing junction 12 at the input side of the converter 4. This negative feedback loop assures the stability of the operation of the amplifier thus far described. The adjustability of the slider along the slidewire resistor 10 provides means for selectively adjusting the gain of the amplifier which, for purposes of industrial instrumentation may be referred to as the adjustability of the span of the instrument.

For a nonisolated signal transmitter a system output signal might be taken directly from the output of the demodulator 8. However, in order to conductively isolate the output circuit from the input circuit, a signal isolator is connected to the output of the demodulator 8 and across the slidewire resistor 10. The signal developed at the output of the demodulator 8 is applied through a scaling resistor 14 which together with the feedback resistor 10 forms a scaling resistance network, to a signal converter or chopper 16. A portion of the unidirectional signal developed at the output of the demodulator 8 is converted thereby to a corresponding proportional alternating signal which is, in turn, applied to an input winding 18 of an isolator transformer 20. The transformer 20 also includes a feedback winding 22 and a sensing or flux difference detecting winding 24. Any signal detected by the winding 24 is amplified in an AC amplifier 26. The output of the amplifier 26 is demodulated or reconverted to a direct current signal in a demodulator 28 the output of which is amplified by a DC amplifier 30. The output of the DC amplifier is fed through a first scaling resistor 32 to an output terminal 34. A signal loop is connected across the extremities of the resistor 32 and includes a series or second scaling resistor 36, which together with the resistor 32, forms a second scaling resistance network, and a feedback signal chopper or converter 38. The output of the converter 38 is applied as input signal to the feedback winding 22 of the isolating transformer 20.

The operation of the portion of the system between the input signal source 2 and the output of the demodulator 8 including the feedback to the summing junction 12 is relatively straightforward and requires no further description in the present instance. The isolator operates as follows. The converter 16 produces an oscillatory signal the amplitude of which is representative of the magnitude of the input signal from the source 2. The oscillatory signal applied to the winding 18 produces a magnetic flux in the core of transformer 20 of a predetermined phase relationship as indicated by the dot at the upper end of the winding 18. The magnetic flux in the core the transformer 20 is detected by the sensing winding 24. The signal developed in the sensing winding 24 is applied to the AC amplifier 26 and thence to the demodulator 28 where the difference signal detected by the sensing winding 24 and amplified by the AC amplifier 26 is converted to a DC voltage signal. That DC voltage signal is converted to a corresponding current signal by the DC amplifier 30. That current signal is applied across the resistor 32 to the output terminal 34 to which any suitable utilization device may be connected. The output current signal is scaled by the resistance network and applied to the converters 38 where the signal is reconverted to a corresponding oscillatory signal which is, in turn, applied to the feedback winding 22 of the transformer 20. It is significant that the phase relationship of the signal applied to the winding 22 with respect to the signal applied to the winding 18 of the same transformer must result in a flux which would tend to oppose the flux generated by the signal applied to the winding 18. There is thus provided a form of null-balance feedback system wherein the fluxes and the core of the transformer 20 are nulled. To the extent that the fluxes resulting from the signal in the windings 18 and 22 do not null, that flux difference is detected by the detector winding 24 and tends to cause a change in the signal applied to the winding 22 in such a direction as to restore the null condition. It is apparent that the output current applied to the output terminal 34 is that current signal which is of sufficient magnitude to cause a current signal to flow in the winding 22 of the transformer 20 which substantially exactly opposes the effective signal applied to the winding 18 of that transformer.

While the isolator has been described thus far in an environment wherein the input signal to the isolator is a current signal and the output signal from the isolator is also a current signal it should be appreciated that, without departing from the spirit and scope of the present invention, either the input signal to the isolator, the output signal from the isolator or both may be voltage signals. It should further be appreciated that since it is the fluxes in the core of the transformer 20 which are effectively nulled, the number of turns of the windings 18 and 22, effectively, may be made equal to each other or bear any predetermined relationship with a corresponding difference in the relationship in the magnitude of the signals applied thereto. Further, it will also be noted that the scaling resistors 14 and 36, respectively, may also be of any predetermined value to produce an output signal which bears a predetermined scale or range relative to the magnitude of an input signal derived from the source 2.

In FIG. 2 there is shown a schematic circuit diagram of an isolator constructed in accordance with the present invention. Those elements shown in FIG. 2 which also appear in the same form in FIG. 1 will be indicated by the same reference numerals as the corresponding elements in FIG. 1. Thus, in FIG. 2, there is shown a pair of input terminals 40 to which an input signal such as that developed by the demodulator 8 of FIG. 1 may be applied. The scaling resistor 14 is connected between the one of the input terminals 40 and one end of the transformer winding 18 of the transformer 20. Between the other of the input terminals 40 and the other end of the winding 18 there is connected a converter which is illustrated as being a solid-state or field-effect transistor 16' switch means. The control or switching signal is applied to the gate electrode of the field-effect transistor (FET) by a lead 42 from an oscillator 44, as will be described in more detail hereinafter. Here again, the current signal flowing through the winding 18 induces an oscillatory flux in the core of the transformer 20 of a phase relationship to produce an instantaneous polarity of the flux as indicated by the dot adjacent the winding 18. The sensing winding 24 detects the net flux in the core of the transformer 20 and applies the resulting signal as input signal to the first stage 46 of a two stage transistor amplifier, the second state of which is represented by a transistor 48. The emitter of the first stage transistor 46 is directly connected to a positive power supply lead 50 which may be typically at +25 volts. One lead of the winding 24 is connected directly to the base electrode of the transistor 46 while the other lead of the winding 24 is connected through a load resistor 52 to the collector electrode of the transistor 46. The collector of the transistor 46 is directly connected to the base electrode of the transistor 48 the emitter of which is connected through a resistor 54 to the power supply lead 50. The collector of the transistor 48 is connected through a resistor 56 to a voltage reference lead 58. The voltage reference level of the lead 58 is established by a Zener diode 60, connected between the leads 50 and 58, and an isolating resistor 62 connected between the lead 58 and ground.

The output or collector of the transistor 48 is coupled through a coupling capacitor 64 to a demodulator shown as solid-state switch or a transistor 28'. The emitter of the transistor 28' is connected directly to the power supply lead 50 while the collector thereof is directly connected to the coupling capacitor 64. The base of the transistor 28' is connected through a diode 66 and a resistor 68 to a lead 70 which is, in turn, connected to the oscillator 44, as will be described in more detail hereinafter. The transistor 28' thus connected constitutes a synchronously driven half-wave demodulator. A T-pad filter includes a series resistor 72, shunt capacitor 74, and a series pair of diodes 76, it is connected between the collector electrode of the transistor 28' and the input of the DC amplifier 30. The DC amplifier includes a pair of PNP transistors 78 and 80 connected as a Darlington pair. The base electrode of the transistor 78 is connected to the diodes 76 of the T-pad filter and, through a resistor 82, to ground. The emitter of the transistor 78 is directly connected to the base electrode of the transistor 80. The emitter of the transistor 80 is connected directly to the power supply lead 50. The collectors of both of the transistors 78 and 80 are connected together and to the junction between the scaling resistors 32 and 36. The opposite or remote end of the resistor 32 is connected to the output terminal 34. The opposite or remote end of the resistor 36 is connected one of the leads of the winding 22 of the transformer 20. The other lead of the winding 22 is connected through a converter, here shown as a solid-state switch or field-effect transistor 38', to the remote end of the scaling resistor 32. The gate electrode of the field-effect transistor (FET) 38' is connected by a lead 84 to the oscillator 44. Again, as will be described in more detail hereinafter, the operation of the converter 38 is such as to produce an oscillatory signal in the winding 22 of such phase relationship as will produce a flux in the core of the transformer 20 which opposes the flux induced by the winding 18. This is schematically represented by the dot adjacent the end of the winding 22.

The signal applied to the terminal 40 is converted to an oscillating signal in the winding 18 by the periodic gating of the FET 16'. Again, the flux produced by the current flowing in the winding 18 is opposed and effectively nulled by the feedback current flowing in the winding 22 of the transformer 20. Any net or resultant flux in the core of the transformer 20 is detected by the winding 24. The signal thus produced is amplified by the AC amplifier including the transistors 46 and 48. The amplifier signal is rectified by the transistor 28', filtered, and applied as a DC signal to the base electrode of the transistor 78 in the Darlington pair comprising the DC amplifier 30. That signal applied to the amplifier 30 effects a control of the magnitude of the current flowing in the conductive loops beginning at the power supply lead 50, the amplifier 30, the scaling resistance network, the output terminals 34 through a load device (not shown) to ground. A portion of that current determined by the ratio of the magnitude of the resistors 36 and 32 flows through the winding 22 and the FET converter 38'. It should be apparent that the current through the winding 22 must be of sufficient amplitude to produce a flux which will effectively null the flux resulting from the current flowing in the winding 18 of the transformer 20. Accordingly, the current in the output loop including the amplifier and the output terminals 34 must be proportional to the magnitude of the signal applied to the input terminals 40.

The oscillator 44 of FIG. 2 and the power supply for the transmitter is shown in some detail in FIG. 3. A pair of power input terminals 86 may be connected a conventional AC power source. The terminals 86 are connected, respectively, to opposite ends of the primary winding 88 of a power transformer 90. The transformer 90 has a center-tapped secondary winding 92 connected to a pair of diodes 94 and 96 in a full-wave rectifier configuration. A filter capacitor 98 provides the conventional smoothing characteristic. The resulting direct current is regulated by a series regulating transistor 100. The transistor 100 is biased by a series connection of a resistor 102 and a pair of Zener diodes 104 connected across the DC power supply leads. The junction between the resistor 102 and the Zeners 104 is connected to the base electrode of the transistor 100. The output of the transistor 100 is, therefore, a regulated DC supply which may, typically, be on the order of 25 volts. The power supply lead 50 shown in FIG. 2 is connected at the output of the regulating transistor 100 and supplies energy to the active elements shown in the schematic circuit diagram of FIG. 2. That voltage is, of course, developed between the lead 50 and a common return lead 106 which is indicated as being grounded. It should be noted, however, that the ground there shown is not an earth ground but merely a common bus or reference ground.

The regulated DC thus developed is applied as input signal to a free running oscillator. The oscillator includes a pair of cross connected transistors 108 and 110 and a saturable-core transformer 112 having a center-tapped primary 114, the center tap of which is connected to the common return lead 106. The remote ends of the primary winding 114 are connected, respectively, to the collectors of the transistors 108 and 110. Also, the collector of the transistor 108 is connected through a resistor 116 to the base electrode of the transistor 110 and the collector of the transistor 110 is connected through a resistor 118 to the base electrode of the transistor 108. The emitters of the transistors 108 and 110 are connected through associated diodes to the power supply lead 50. The foregoing association of the transistors 110 and the saturable-core transformer 112 produces a free running oscillator which oscillates at a predetermined frequency such, for example, as 400 hertz. A secondary winding 120 on the transformer 112 detects the oscillatory signal thus produced and applies it as driving or switching signal to the converter 38 (the FET 38', in FIG. 2) whereby the DC signal supplied thereto is chopped at the oscillatory frequency. Similarly, the transformer lead connected to the emitter of the transister 108 is connected by the lead 70 to apply the oscillatory signal thus developed to the demodulator 28 of FIG. 1 (the demodulating transistor 28' of FIG. 2) providing a synchronous demodulation of the alternating signal applied thereto. A further center-tapped secondary winding 122 is connected in a full-wave rectification network including a pair of diodes 124 and 126, the center-tap being connected to a common return lead 128. The common return lead 128 is shown as grounded, however, it should be understood that this ground is a local common bus and is isolated from earth and also isolated from the ground lead 106. A shunt capacitor 130 provides the filter for the rectified power supply signal. The oscillatory signal developed in the secondary winding 122 is also supplied through a diode 132 and a pair of voltage dividing resistors 134 and 136 to the lead 42 which supplies the driving signal to the modulator or converter 16 shown in FIG. 1 (the FET 16' shown in FIG. 2) thus the signal applied to the winding 18 of the transformer 20 is chopped at the same frequency as the signal applied to the winding 22 of that transformer. Since the demodulator 28 (28') is also driven at this same frequency it becomes a synchronous demodulator. The same signal which was supplied to drive the converter 16 is also supplied to drive the converter 4 shown in FIG. 1. A connection from the opposite end of the secondary winding 122 from that to which the diode 132 is connected applies the oscillatory signal developed in the secondary winding 122 as driving or switching signal to the demodulator 8 shown in FIG. 1. Thus, this demodulator also is an synchronous demodulator. The full rectified and filtered DC signal developed from the secondary winding 122 is applied as an isolated DC power supply for the active elements of that portion of the circuit shown in FIG. 1 between the input signal source 2 and the converter 16. The significance, therefore, of the isolation of the local common or ground conductors 128 and 106 from earth ground and from each other may be seen. While the power supply circuit illustrated in FIG. 3 does not, of itself, constitute a part of the present invention it is included to complete the disclosure of the isolation technique which does comprise the present invention.

Thus it may be seen that there has been provided in accordance with the present invention an improved signal line isolator which is characterized in that a highly accurate translation of a DC input signal is provided and which features considerable flexibility in its application.

The embodiments of the invention in which an exclusive property or privilege I claim are defined as follows:

1. A signal isolator for conductively isolating a DC input signal means from an output DC signal means, said isolator comprising a transformer having an input winding means, a feedback winding means and a flex difference sensing winding means;

means connected to said input winding means for converting DC input signals to alternating signals whereby to produce a first alternating magnetic flux in said transformer;

means connected to said flux difference sensing winding for producing an output DC signal proportional to the amplitude of the flux difference sensed by said sensing winding;

means responsive to said output signal for producing a proportional alternating feedback signal;

and means connected to said feedback winding means for applying said feedback signal thereto whereby to produce a second alternating magnetic flux in said transformer in opposition to said first alternating magnetic flux, said flux difference sensed by said sensing winding being the resultant of said first and second alternating magnetic flux.

2. The invention as set forth in claim 1 wherein said means connected to said flux difference winding comprises an AC amplifier, a signal demodulator and a DC amplifier, said DC amplifier being characterized in that an output current signal is produced which is proportional to an input voltage signal.

3. The invention as set forth in claim 2 wherein said means for producing an alternating feedback signal comprises a scaling resistance network connected to the output of said DC amplifier and a signal converter connected between said resistance network and said feedback winding, said signal converter being operated synchronously with said converting means connected to said input winding.

4. The invention as set forth in claim 3 wherein said signal demodulator is driven synchronously with respect to said converting means connected to said input winding.

5. The invention as set forth in claim 1 wherein said converting means comprises a solid-state signal converter.

6. The invention as set forth in claim 3 wherein said signal converting means connected to said input winding, said converter connected to said feedback winding and said demodulator are each solid-state switching means.

7. The invention as set forth in claim 6 wherein said DC amplifier comprises a pair of transistors connected as a Darlington pair.

8. An isolated signal transmitter comprising, in combination, input means for connection to a source of DC input signals; first converter means connected to said input means for providing an alternating signal proportional to said input signal; an AC amplifier connected to the output of said first converter means for amplifying said alternating signal; a first demodulator connected to the output of said AC amplifier and driven synchronously with said first converter means for producing a DC signal proportional to said amplified AC signal; a negative feedback circuit connected between the output of said first demodulator and the input of said first converter means; a second signal converter means; a first signal scaling resistance network connected between the output of said first demodulator and said second converter means, transformer having an input winding, a feedback winding, and a flux difference sensing winding; the output of said second converter means being connected to said input winding whereby to produce a first alternating magnetic flux in said transformer; a second AC amplifier, said flux difference sensing winding being connected to the input of said AC amplifier for amplifying alternating signals developed in said sensing winding;

a second demodulator having its input connected to the output of said second AC amplifier and driven synchronously with said second converter means whereby to produce a DC signal proportional to said alternating signals developed in said sensing winding;

a DC amplifier connected to the output of said second demodulator for producing an output current signal proportional to said last mentioned DC signal;

a third signal converter means;

a second signal scaling resistance network connected between the output of said DC amplifier and the input of said third signal converter means, the output of said third converter means being connected to said feedback winding on said transformer whereby to produce a second alternating magnetic flux in said transformer in opposition to said first alternating magnetic flux, said flux difference sensed by said sensing winding being the resultant of said first and second alternating magnetic flux.